(12) United States Patent
Li et al.

(10) Patent No.: US 11,509,091 B2
(45) Date of Patent: Nov. 22, 2022

(54) CABLE SECURING CLAMP AND DATA TRANSMISSION DEVICE

(71) Applicant: LUXSHARE PRECISION INDUSTRY CO., LTD., Shenzhen (CN)

(72) Inventors: Huabing Li, Shenzhen (CN); Zhongyuan Lai, Shenzhen (CN); Yu Huang, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 0 days.

(21) Appl. No.: 17/321,927

(22) Filed: May 17, 2021

(65) Prior Publication Data
US 2022/0278485 A1     Sep. 1, 2022

(30) Foreign Application Priority Data
Feb. 26, 2021   (CN) .......................... 202110221157.7

(51) Int. Cl.
  *H01R 13/58*   (2006.01)
  *H01R 12/77*   (2011.01)
(52) U.S. Cl.
  CPC ....... *H01R 13/5804* (2013.01); *H01R 12/772* (2013.01); *H01R 13/5829* (2013.01)
(58) Field of Classification Search
  CPC ............ H01R 13/5804; H01R 13/5829; H01R 12/772
  See application file for complete search history.

(56) References Cited

U.S. PATENT DOCUMENTS 4,636,023 A * 1/1987 Olsson ................. H01R 12/772
                                                                439/456
5,132,493 A   7/1992 Sheehan
(Continued)

FOREIGN PATENT DOCUMENTS

CN         207459606 U      6/2018
CN         109417246 A      3/2019
(Continued)

OTHER PUBLICATIONS

Chinese Office Action and Search Report for Chinese Application No. 202110221157.7 dated May 7, 2022, with English translation.

*Primary Examiner* — Oscar C Jimenez
*Assistant Examiner* — Paul D Baillargeon
(74) *Attorney, Agent, or Firm* — Birch, Stewart, Kolasch & Birch, LLP (57) ABSTRACT

Provided are a cable securing clamp and a data transmission device. The cable securing clamp includes a clamp body and a snap member. The clamp body is provided with a first through hole, a side wall of the clamp body is provided with a second through hole communicating with the first through hole, and the first through hole is configured to allow a cable to pass through. A first end of the snap member is pivotally connected to the clamp body, a second end of the snap member is in interference fit with the second through hole, a surface of the second end of the snap member is provided with a tooth structure, and the tooth structure is configured to snap the cable in the first through hole such that the cable is secured in an extending direction of the first through hole.

15 Claims, 5 Drawing Sheets

(56) References Cited

U.S. PATENT DOCUMENTS

| | | | |
|---|---|---|---|
| 6,604,966 B1* | 8/2003 | Hayes | H01R 13/5829 |
| | | | 439/459 |
| 6,791,031 B1 | 9/2004 | Manning | |
| 7,458,852 B2* | 12/2008 | Gunreben | H01R 13/447 |
| | | | 439/596 |
| 8,342,877 B2* | 1/2013 | De Bruijn | H01R 13/595 |
| | | | 439/470 |
| 2005/0233642 A1 | 10/2005 | Gerlich et al. | |
| 2014/0050906 A1* | 2/2014 | Haimoff | B29C 45/0025 |
| | | | 425/555 |
| 2015/0048614 A1 | 2/2015 | Coyle, Jr. | |
| 2018/0301885 A1 | 10/2018 | Jackson | |
| 2022/0115826 A1* | 4/2022 | LaFerriere | H01R 13/748 |

FOREIGN PATENT DOCUMENTS

| | | |
|---|---|---|
| CN | 110966461 A | 4/2020 |
| DE | 34 09 958 A1 | 9/1985 |
| EP | 1 050 930 A1 | 11/2000 |
| EP | 1 257 011 A2 | 11/2002 |
| EP | 1 808 629 A2 | 7/2007 |
| TW | I487211 B | 6/2015 |
| WO | WO 99/61831 A1 | 12/1999 |

\* cited by examiner

CABLE SECURING CLAMP AND DATA TRANSMISSION DEVICE

CROSS-REFERENCE TO RELATED APPLICATION(S)

This application claims priority to a Chinese patent application No. 202110221157.7 filed on Feb. 26, 2021, disclosure of which is incorporated herein by reference in its entirety.

TECHNICAL FIELD

The present disclosure relates to the technical field of securing cables and, in particular, to a cable securing clamp and a data transmission device.

BACKGROUND

Cables, as a common transmission medium, are commonly used to transmit signals between different equipments, and cables are commonly used with connectors when applied to electronic equipments.

In the related art, cables in an electronic equipment are generally secured by clamps secured to the electronic equipment. A clamp includes an upper casing and a lower casing. The upper casing is provided with a first groove, the lower casing is provided with a second groove fit with the first groove, and the first groove and the second groove form a securing hole. A cable passes through the securing hole to be secured in a radial direction of the securing hole. However, when the electronic equipment is severely impacted, the cable is relatively prone to move relative to the clamp along an axial direction of the securing hole. As a result, the cable drives a connector at an end portion of the cable to shake, so that the strength of the connection between the connector and the electronic equipment is influenced, and the reliability of signal transmission of the electronic equipment is further influenced.

SUMMARY

The present disclosure provides a cable securing clamp, which improves the strength and reliability of securing a cable.

The present disclosure further provides a data transmission device, which avoids the situation where a connector is loosened due to violent vibration of an electronic equipment, improves the strength of the connection between the connector and the electronic equipment, and improves the stability of the data transmission device transmitting data.

The present disclosure provides the solutions described below.

A cable securing clamp is provided and includes a clamp body and a snap member.

The clamp body is provided with a first through hole penetrating through two ends of the clamp body, a side wall of the clamp body is provided with a second through hole communicating with the first through hole, and the first through hole is configured to allow a cable to pass through.

A first end of the snap member is pivotally connected to the clamp body, a second end of the snap member is in interference fit with the second through hole, a surface of the second end of the snap member is provided with a tooth structure, and the tooth structure is configured to snap the cable in the first through hole such that the cable is secured in an extending direction of the first through hole.

A data transmission device is provided and includes a cable, a connector connected to an end of the cable and the cable securing clamp described above.

REFERENCE LIST

1 clamp body
11 body portion
111 groove
12 securing portion
121 hole structure
101 first through hole
102 second through hole
2 snap member
21 connecting portion
22 meshing portion
3 tooth structure
4 buckle
5 buckling groove
6 stop member
7 protective housing
71 interference portion
10 cable
20 ground wire
30 connector

DETAILED DESCRIPTION

Solutions of the present disclosure are described below through embodiments in conjunction with drawings. In addition, it should be noted that for ease of description, only part, instead of all, related to the present disclosure is illustrated in the drawings.

In the description of the present disclosure, it should be noted that the orientations or position relations indicated by terms such as "center", "above", "below", "left", "right", "vertical", "horizontal", "inside", "outside" and the like are based on orientations or position relations shown in the drawings. These orientations or position relations are intended only to facilitate and simplify description of the present disclosure, and not to indicate or imply that a device or element referred to must have such specific orientations or must be configured or operated in such specific orientations. In addition, terms such as "first" and "second" are used merely for the purpose of description and are not to be construed as indicating or implying relative importance.

In the description of the present disclosure, it should be noted that unless otherwise expressly specified and limited, the term "mounting", "connected to each other" or "connected" is to be construed in a broad sense, for example, as securely connected or detachably connected; mechanically connected or electrically connected; directly connected to each other or indirectly connected to each other via an intermediary; or internally connected between two elements. For those of ordinary skill in the art, meanings of the preceding terms in the present disclosure may be construed based on situations.

An embodiment provides a data transmission device. As shown in FIG. 1 to FIG. 9, the data transmission device includes a cable 10, a connector 30 connected to an end of the cable 10 and a cable securing clamp. The cable 10 is secured, through the cable securing clamp, in an electronic equipment applying the data transmission device, so that the reliability of securing the cable 10 is improved, the situation where the connector 30 is loosened due to violent vibration of the electronic equipment is avoided, the strength of the connection between the connector 30 and the electronic equipment is improved, and the stability of the data transmission device transmitting data is improved. Optionally, the cable securing clamp may be secured to a shell of the electronic equipment.

Figure 1:
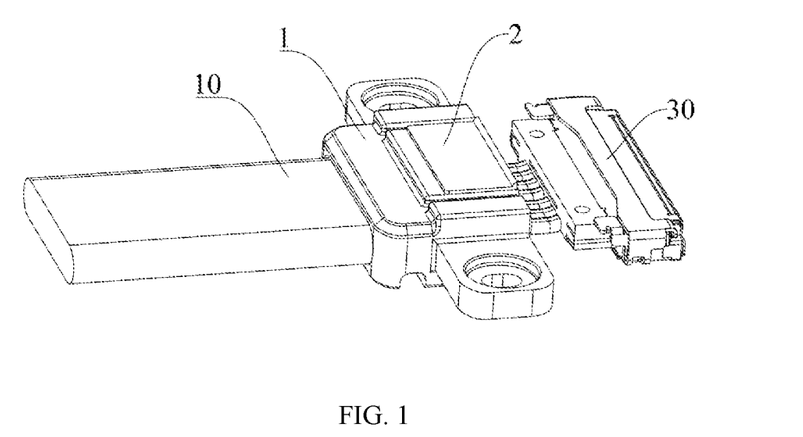
FIG. 1 is a structural view one of a data transmission device according to an embodiment of the present disclosure.
Figure 2:
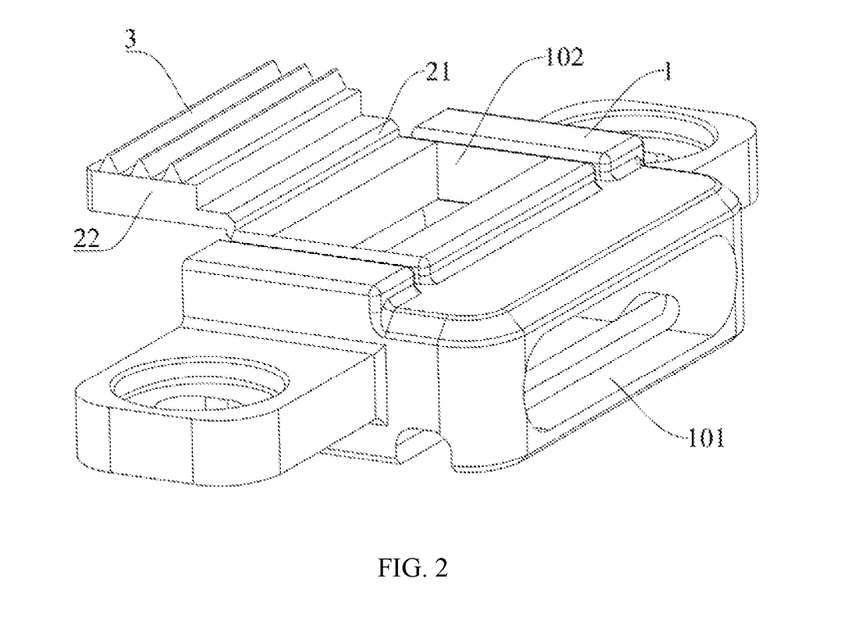
FIG. 2 is a structural view one of a cable securing clamp according to an embodiment of the present disclosure.

As shown in FIG. 1 and FIG. 2, the cable securing clamp includes a clamp body 1 and a snap member 2. The clamp body 1 may be secured to the shell of the electronic equipment, and the snap member 2 is configured to secure the cable 10 to the clamp body 1.

In an embodiment, as shown in FIG. 2, the clamp body 1 is provided with a first through hole 101 penetrating through two ends of the clamp body 1. The first through hole 101 is configured to allow the cable 10 to pass through. That is, the clamp body 1 is sleeved on the cable 10 through the first through hole 101. A side wall of the clamp body 1 is provided with a second through hole 102 communicating with the first through hole 101. That is, an extending direction of the first through hole 101 is perpendicular to an extending direction of the second through hole 102.

Figure 3:
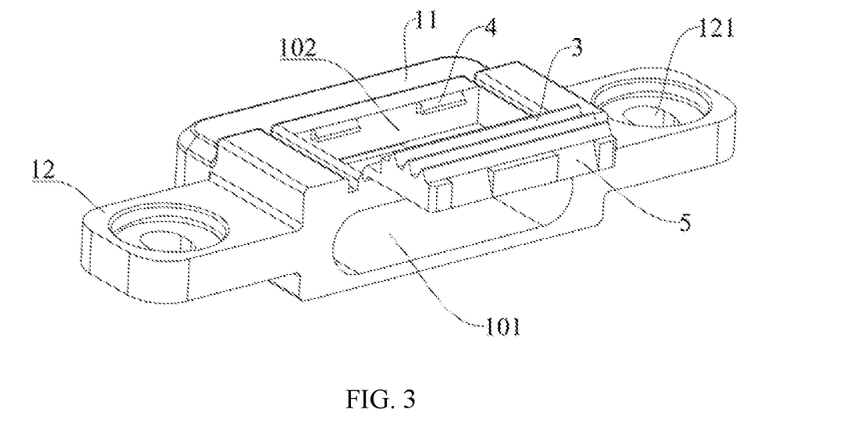
FIG. 3 is a structural view two of a cable securing clamp according to an embodiment of the present disclosure.

A first end of the snap member 2 is pivotally connected to the clamp body 1, and a second end of the snap member 2 is in interference fit with the second through hole 102. For example, an outer contour of the second end of the snap member 2 is larger than an outer contour of the second through hole 102. Exemplarily, the snap member 2 may be pressed into the second through hole 102 by a preset force so that the snap member 2 cannot move relative to the second through hole 102. Referring to FIG. 3, a surface of the second end of the snap member 2 is provided with a tooth structure 3. In an embodiment, the tooth structure 3 is disposed on a surface of the second end of the snap member 2 facing the first through hole 101, and the tooth structure 3 is configured to snap the cable 10 in the first through hole 101 so as to secure the cable 10 in the extending direction of the first through hole 101, thereby preventing the cable 10 from moving relative to the clamp body 1. The extending direction of the first through hole 101 is parallel to an axial direction of the cable 10.

According to the cable securing clamp provided by the embodiment, the clamp body 1 is sleeved on the cable 10 through the first through hole 101, and the second end of the snap member 2 is in interference fit with the second through hole 102. Therefore, pressure is applied by the snap member 2 to the cable 10 through the tooth structure 3, so that the cable 10 can be secured in a radial direction (which is the extending direction of the second through hole 102) of the cable 10; a tail end of the tooth structure 3 snaps the cable 10, so that the cable 10 can be secured in the axial direction (which is the extending direction of the first through hole 101) of the cable 10. In this way, securing the cable 10 in three dimensions is achieved, so that the strength and reliability of securing the cable 10 are improved.

In the embodiment, the snap member 2 and the clamp body 1 are an integrated structure. That is, the snap member 2 and the clamp body 1 may be formed in one manufacturing process, such as molding by injection, so that the manufacturing of the cable securing clamp is facilitated. Similarly, the tooth structure 3 and the snap member 2 are an integrated structure, so that the strength of the connection between the tooth structure 3 and the snap member 2 is improved. Moreover, the material of the clamp body 1 and the snap member 2 in the embodiment includes resin, polyethylene, polyvinyl chloride, phenolic aldehyde and the like respectively, that is, both the clamp body 1 and the snap member 2 are non-metallic material, so that the clamp body 1 and the snap member 2 are prevented from conducting electricity.

Optionally, as shown in FIG. 2, the snap member 2 includes a connecting portion 21 pivotally connected to the clamp body 1 and a meshing portion 22 protruding outward from the connecting portion 21. The meshing portion 22 is in interference fit with the second through hole 102, and the tooth structure 3 is disposed on a surface of the meshing portion 22. In an embodiment, when the meshing portion 22 is located in the second through hole 102, the tooth structure 3 is disposed on a bottom surface of the meshing portion 22. In the embodiment, the connecting portion 21 and the meshing portion 22 are an integrated structure, and the meshing portion 22 can rotate relative to the clamp body 1 through the connecting portion 21.

Exemplarily, implementations to achieve the interference fit between the meshing portion 22 and the second through hole 102 may be various, and the embodiment provides two implementations described below.

Figure 4:
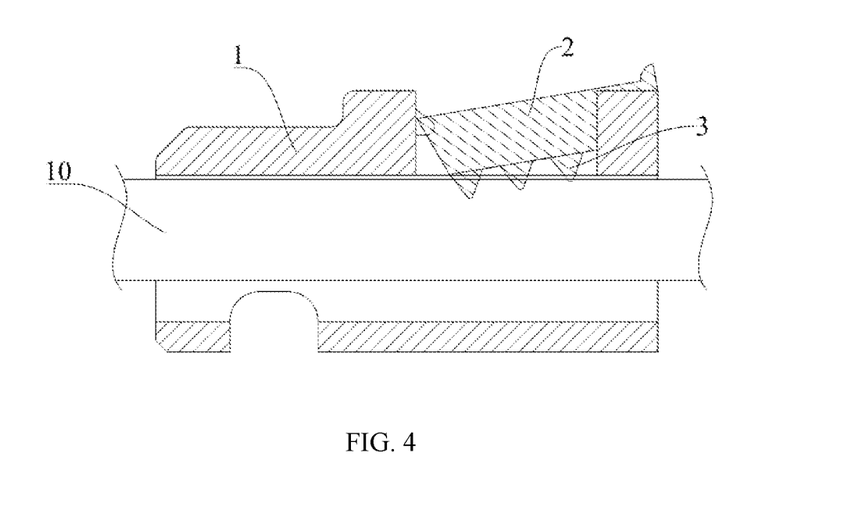
FIG. 4 is a sectional view of a cable securing clamp according to an embodiment of the present disclosure.

In an implementation in which the meshing portion 22 is in interference fit with the second through hole 102, as shown in FIG. 3 and FIG. 4, an inner wall of the second through hole 102 is provided with a buckle 4. The buckle 4 may be a protrusion disposed on the inner wall of the second through hole 102. An end portion of the meshing portion 22 is provided with a buckling groove 5. Optionally, an end portion of an end of the meshing portion 22 away from the connecting portion 21 is provided with a buckling groove 5. The buckling groove 5 is engaged with the buckle 4 by buckling to secure the meshing portion 22 in the second through hole 102.

Exemplarily, the length of the buckling groove 5 in a preset direction is smaller than the length of the buckle 4 in the preset direction. When the meshing portion 22 is pressed into the second through hole 102, the buckle 4 can be pressed into the buckling groove 5, so that the buckle 4 is in interference fit with the buckling groove 5, and the meshing portion 22 is pressed and secured into the second through hole 102. Optionally, the buckle 4 and the meshing portion 22 are an integrated structure to ensure relatively high strength of connection.

In the embodiment, two buckles 4 are disposed and spaced apart, correspondingly, two buckling grooves 5 are disposed, and the two buckles 4 are in one to one correspondence with the two buckling grooves 5. Each buckle 4 is engaged with the corresponding buckling groove 5 by buckling, so that the strength and reliability of securing the meshing portion 22 in the second through hole 102 are improved.

Figure 5:
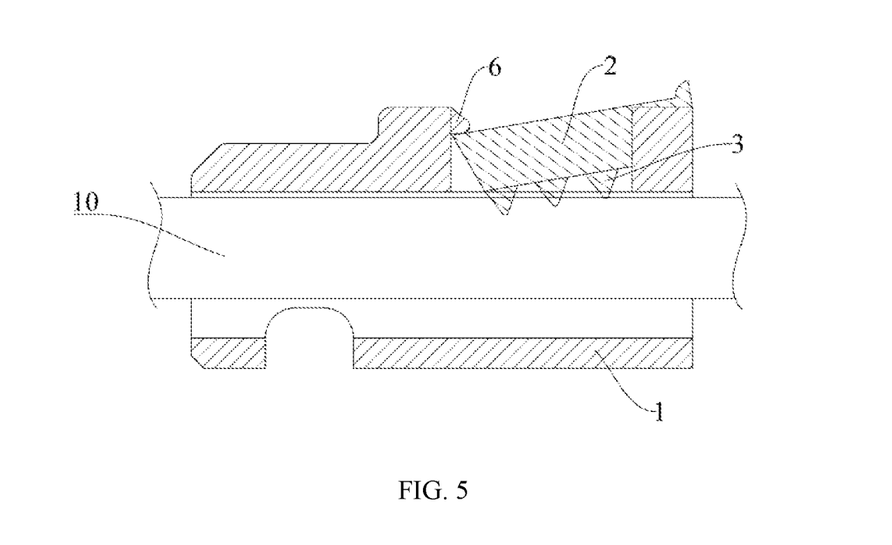
FIG. 5 is a sectional view of another cable securing clamp according to an embodiment of the present disclosure.

In the other implementation in which the meshing portion 22 is in interference fit with the second through hole 102, as shown in FIG. 5, the inner wall of the second through hole 102 is provided with a stop member 6, and an edge of the meshing portion 22 is located below the stop member 6 and abuts against the stop member 6. The meshing portion 22 may be limited by the stop member 6, so that the meshing portion 22 is prevented from moving in the first through hole 102. Exemplarily, the stop member 6 may be a stop block.

Optionally, with continued reference to FIG. 5, an upper surface of the stop member 6 is an inclined surface. Optionally, the upper surface is inclined downward from the hole wall of the second through hole 102, which is conducive to pressing the meshing portion 22 into the second through hole 102. Exemplarily, an end surface of the meshing portion 22 away from the connecting portion 21 may also be an inclined surface, so that the meshing portion 22 may be pressed into the second through hole 102 with relatively less effort.

In both of the implementations described above, the meshing portion 22 can be stably secured in the second through hole 102, so that the tooth structure 3 on the meshing portion 22 can better snap the cable 10.

Optionally, as shown in FIG. 4 or FIG. 5, the tooth structure 3 is inclined, and the tail end of the tooth structure 3 pierces a coat of the cable 10 to firmly grasp the cable 10, so that the probability of the cable 10 moving in the extending direction of the first through hole 101 is reduced.

Figure 6:
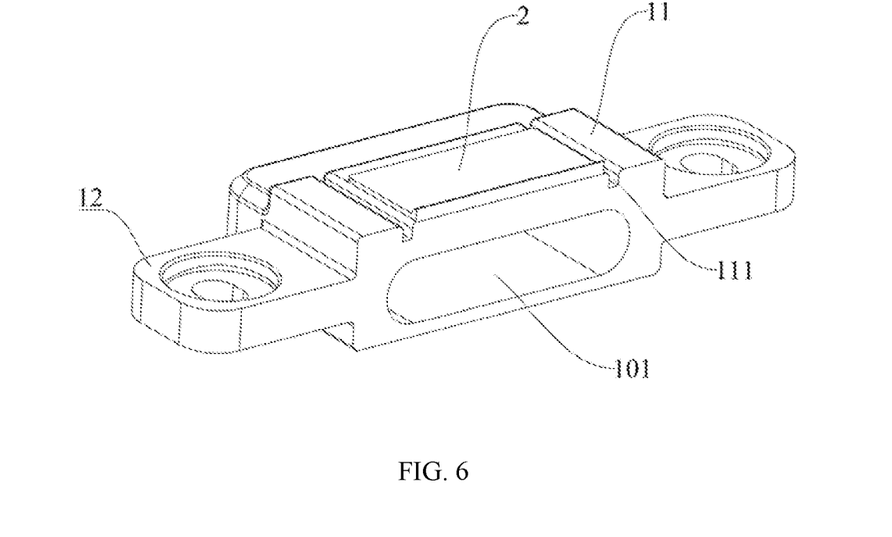
FIG. 6 is a reference view showing a usage state of a cable securing clamp according to an embodiment of the present disclosure.

Referring to FIG. 6, the clamp body 1 includes a body portion 11 and securing portions 12. The securing portions 12 protrude outward in a first direction from opposite two sides of the body portion 11 respectively, and the first through hole 101 and the second through hole 102 each are formed in the body portion. The body portion 11 is secured to the electronic equipment through two securing portions 12. In an embodiment, each securing portion 12 is provided with a hole structure 121, and the securing portions 12 and the body portion 11 are secured to the electronic equipment through bolts penetrating through hole structures 121. The first direction is perpendicular to the extending direction of the first through hole 101 and perpendicular to the extending direction of the second through hole 102, so that the securing portion 12 does not interfere with the cable 10 and the snap member 2.

Figure 9:
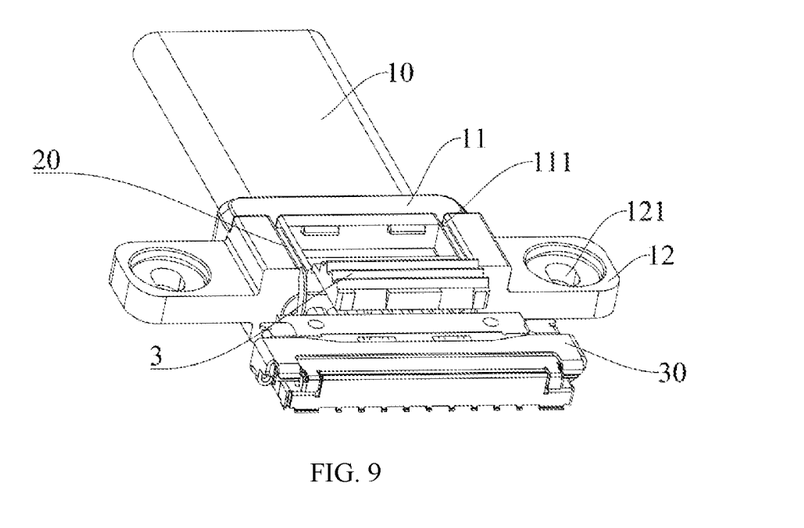
FIG. 9 is a structural view four of a data transmission device according to an embodiment of the present disclosure.

In an embodiment, as shown in FIG. 6 and FIG. 9, a preset surface of the body portion 11 is provided with a groove 111 for clamping a ground wire 20 of the cable 10. After the cable 10 passes through the first through hole 101, or after the clamp body 1 is molded by injection on the cable 10, the ground wire 20 may be bent into the groove 11. With this configuration, on the one hand, the grounding of the ground wire 20 is facilitated, on the other hand, the ground wire 20 can be secured by the groove 111 so that the securing effect of the cable 10 is improved. The preset surface is a surface of the body portion 11 provided with the second through hole 102.

Figure 7:
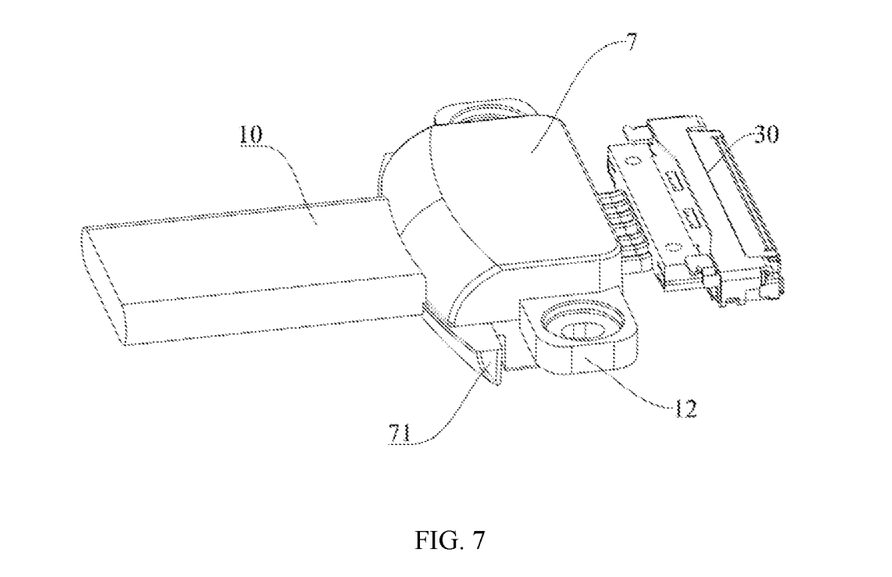
FIG. 7 is a structural view two of a data transmission device according to an embodiment of the present disclosure.
Figure 8:
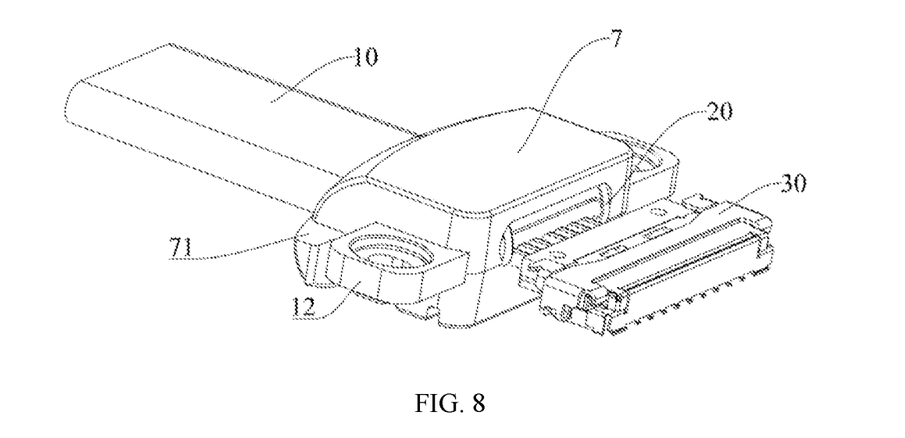
FIG. 8 is a structural view three of a data transmission device according to an embodiment of the present disclosure.

Optionally, as shown in FIG. 7, the cable securing clamp further includes a protective housing 7. The protective housing 7 wraps the body portion 11, the snap member 2 and part of the securing portion 12 to prevent dust from entering the body portion 11 and the snap member 2. The protective housing 7 may be molded by injection outside the body portion 11 and the snap member 2. Exemplarily, as shown in FIG. 7, an end portion of the protective casing 7 may be provided with an interference portion 71. The interference portion 71 may be configured to interfere with structures in the electronic equipment so as to improve the stability of the cable securing clamp relative to the electronic equipment.

According to the cable securing clamp provided by the present disclosure, the clamp body is sleeved on the cable through the first through hole, and the second end of the snap member is in interference fit with the second through hole. Therefore, pressure is applied by the snap member to the cable through the tooth structure, so that the cable can be secured in a radial direction of the cable; the tail end of the tooth structure snaps the cable, so that the cable can be secured in an axial direction of the cable. In this way, securing the cable in three dimensions is achieved, so that the strength and reliability of securing the cable are improved.

According to the data transmission device provided by the present disclosure, the cable is secured to a shell of an electronic equipment applying the data transmission device through the cable securing clamp, so that the situation where the connector is loosened due to violent vibration of the electronic equipment is avoided, the strength of the connection between the connector and the electronic equipment is improved, and the stability of the data transmission device transmitting data is improved.

What is claimed is:

1. A cable securing clamp, comprising:
    a clamp body, wherein the clamp body is provided with a first through hole penetrating through two ends of the clamp body, a side wall of the clamp body is provided with a second through hole communicating with the first through hole, and the first through hole is configured to allow a cable to pass through; and
    a snap member, wherein a first end of the snap member is pivotally connected to the clamp body, a second end of the snap member is in interference fit with the second through hole, a surface of the second end of the snap member is provided with a tooth structure, and the tooth structure is configured to snap the cable in the first through hole such that the cable is secured in an extending direction of the first through hole;
    wherein the clamp body comprises a body portion and securing portions, wherein the securing portions protrude outward in a first direction from opposite two sides of the body portion respectively, the first through hole and the second through hole each are formed in the body portion, each of the securing portions is provided with a hole structure, and the first direction is perpendicular to the extending direction of the first through hole and perpendicular to an extending direction of the second through hole;
    wherein a preset surface of the body portion is provided with a groove for clamping a ground wire of the cable, and the preset surface is a surface of the body portion provided with the second through hole.

2. The cable securing clamp according to claim 1, wherein the snap member comprises a connecting portion pivotally connected to the clamp body and a meshing portion protruding from the connecting portion, wherein the meshing portion is in interference fit with the second through hole, and the tooth structure is disposed on a surface of the meshing portion.

3. The cable securing clamp according to claim 2, wherein an inner wall of the second through hole is provided with a buckle, and an end portion of the meshing portion is provided with a buckling groove, wherein the buckling groove is configured to be engaged with the buckle by buckling.

4. The cable securing clamp according to claim 2, wherein an inner wall of the second through hole is provided with a stop member, and an edge of the meshing portion is configured to be located below the stop member and to abut against the stop member.

5. The cable securing clamp according to claim 4, wherein an upper surface of the stop member is an inclined surface.

6. The cable securing clamp according to claim 1, further comprising a protective housing, wherein the protective housing is molded by injection outside the body portion and the snap member.

7. The cable securing clamp according to claim 1, wherein the tooth structure is inclined, and a tail end of the tooth structure pierces a coat of the cable.

8. A data transmission device, comprising a cable, a connector connected to an end of the cable and the cable securing clamp according to claim 1.

9. The data transmission device according to claim 8, wherein the snap member comprises a connecting portion pivotally connected to the clamp body and a meshing portion protruding from the connecting portion, wherein the meshing portion is in interference fit with the second through hole, and the tooth structure is disposed on a surface of the meshing portion.

10. The data transmission device according to claim 9, wherein an inner wall of the second through hole is provided with a buckle, and an end portion of the meshing portion is provided with a buckling groove, wherein the buckling groove is configured to be engaged with the buckle by buckling.

11. The data transmission device according to claim 9, wherein an inner wall of the second through hole is provided with a stop member, and an edge of the meshing portion is configured to be located below the stop member and to abut against the stop member.

12. The data transmission device according to claim 11, wherein an upper surface of the stop member is an inclined surface.

13. The data transmission device according to claim 8, further comprising a protective housing, wherein the protective housing is molded by injection outside the body portion and the snap member.

14. The data transmission device according to claim 8, wherein the tooth structure is inclined, and a tail end of the tooth structure pierces a coat of the cable.

15. A cable securing clamp, comprising:
a clamp body, wherein the clamp body is provided with a first through hole penetrating through two ends of the clamp body, a side wall of the clamp body is provided with a second through hole communicating with the first through hole, and the first through hole is configured to allow a cable to pass through; and
a snap member, wherein a first end of the snap member is pivotally connected to the clamp body, a second end of the snap member is in interference fit with the second through hole, a surface of the second end of the snap member is provided with a tooth structure, and the tooth structure is configured to snap the cable in the first through hole such that the cable is secured in an extending direction of the first through hole;
wherein the tooth structure is inclined, and a tail end of the tooth structure pierces a coat of the cable.

* * * * *